(12) United States Patent
Rosen et al.

(10) Patent No.: US 6,272,595 B1
(45) Date of Patent: Aug. 7, 2001

(54) N-WAY SET-ASSOCIATIVE CACHE MEMORY WHICH INCLUDES A STORE HIT BUFFER FOR IMPROVED DATA ACCESS

(75) Inventors: Eitan Rosen; Jack Doweck, both of Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/286,265

(22) Filed: Aug. 5, 1994

(51) Int. Cl.[7] .............................. G06F 12/08; G06F 13/14
(52) U.S. Cl. .......................... 711/128; 711/154; 711/138
(58) Field of Search ..................................... 395/455, 444, 395/445, 250, 375, 872, 239.7; 711/3, 137–138, 204, 210–211, 154, 128; 709/52; 365/189.02, 189.05, 189.07

(56) References Cited

U.S. PATENT DOCUMENTS 5,222,223 * 6/1993 Webb, Jr. et al. .................... 395/467
5,224,214 * 6/1993 Rosich ................................. 395/250
5,517,660 * 5/1996 Rosich ................................. 395/800

OTHER PUBLICATIONS

"Computer Architecture A Qualitative Approach"; Patterson, David et al.; Morgan Kaufman Publishers, San Mateo Ca; 1990; pp. 409–417, 1990.*
Patterson et al., *Computer Architecture A Qualitative Approach*, 1990, pp. 408–417.*

* cited by examiner

*Primary Examiner*—Matthew Kim
*Assistant Examiner*—Denise Tran
(74) *Attorney, Agent, or Firm*—Blakely, Sokoloff, Taylor & Zafman LLP

(57) ABSTRACT

A cache memory circuit is disclosed that includes a store hit buffer that buffers write operations to the cache memory circuit and that removes write operations from the critical speed path for the cache memory array. The store hit buffer includes circuitry for determining whether a read operation to the cache memory circuit is targeted for the write operation stored in the store hit buffer and circuitry for merging the write operation from the store hit buffer with the read operation.

12 Claims, 4 Drawing Sheets

N-WAY SET-ASSOCIATIVE CACHE MEMORY WHICH INCLUDES A STORE HIT BUFFER FOR IMPROVED DATA ACCESS

BACKGROUND OF THE INVENTION

1. Field of the Invention

The present invention pertains to the field of integrated circuit devices. More particularly, this invention relates to cache memory circuits.

2. Background

A cache memory is a random access memory that buffers data from a main memory. A cache memory is typically employed to provide high bandwidth memory accessing to a processor. Typically, such a cache memory reflects selected locations of the main memory. A typical prior cache memory contains a memory array that is usually organized into a set of cache blocks. The cache blocks are typically referred to as cache lines. A cache memory is usually smaller than the corresponding main memory. As a consequence, each cache line stored in the cache memory includes a corresponding address tag that identifies the main memory location for that cache line.

Prior cache memories typically implement a pipelined write architecture. In such a cache memory, a write operation requires two clock cycles. During a first cycle of the write operation, the processor transfers an address and a data value for the write operation to the cache memory. The cache memory typically latches the address and the data value into a set of pipeline registers. During a second cycle of the write operation, the cache memory transfers the data value and associated address tags into the memory array.

A prior pipelined write architecture for a cache memory typically provides high input bandwidth during write operations. Such an architecture enables the processor to supply a new write data value to the cache memory during each clock cycle while the cache memory transfers the previous write data value into the memory array.

Unfortunately, a pipelined write architecture typically causes a wait state in the cache memory for a read operation that immediately follows a write operation. Such a wait state usually occurs while the cache memory transfers the write data value of the preceding write operation into the memory array. A wait cycle is typically required because the read operation may be targeted for the same cache line as the preceding write operation that is buffered in the write pipeline registers. The cache memory must transfer the buffered write operation to the memory array before the subsequent read operation can be processed. Unfortunately, such wait cycles decrease the overall throughput to such a prior cache memory.

Other prior cache memories implement single cycle non-pipelined write operations. In this type of cache memory, the processor supplies the write data value to the cache memory early in the write cycle in order to enable the cache memory to transfer the write data value to the memory array during the same cycle. Unfortunately, single cycle cache memories stress the write timing of the processor. As a consequence, such prior single cycle cache memories are typically limited to lower input bandwidths than cache memories having a pipelined write architecture.

SUMMARY AND OBJECTS OF THE INVENTION

One object of the present invention is to enable high bandwidth read and write accesses to a cache memory.

Another object of the present invention is enable one cycle read and one cycle write operations from a processor to a cache memory.

Another object of the present invention is to provide a cache memory that does not impose a cache access wait state if a read operation immediately follows a write operation wherein the read and write operations target the same cache line.

A further object of the present invention is to relax the timing constraints for cache memory design by removing cache memory writes from the critical speed path to the cache memory array.

Another object of the present invention is to buffer a write operation to a cache memory and to perform the buffered write operation during a later cycle to the cache memory array with relaxed timing constraints.

Another object of the present invention is to access the buffered write operation and to merge the buffered data with cache array data for a read operation targeted for the same cache line as the buffered write operation.

Another object of the present invention is to merge the buffered data with cache array data for a read operation without causing delays in the critical speed path for the read operation.

These and other objects of the invention are provided by a cache memory circuit comprising a memory array for buffering a set of cache lines and a set of corresponding address tags. The cache memory circuit includes a store hit buffer coupled to receive and store a write operation to the cache memory circuit. The store hit buffer comprises circuitry for determining whether a read operation to the cache memory circuit is targeted for the write operation stored in the store hit buffer. The cache memory circuit further comprises circuitry for merging the write operation from the store hit buffer with the read operation.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
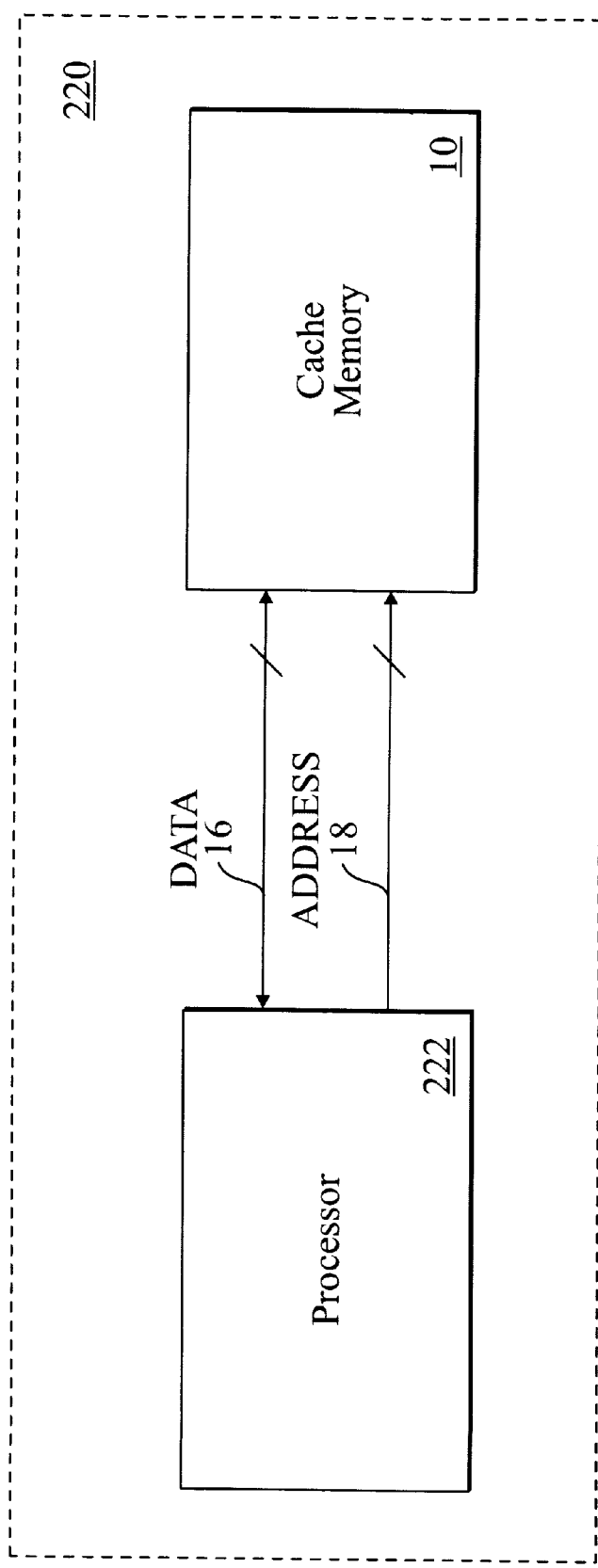
FIG. 1 illustrates an integrated circuit die that contains a processor that communicates with a cache memory over an address bus and a data bus during read and write operations.

FIG. 1 illustrates an integrated circuit die 220 that contains a processor 222 and the cache memory 10. The processor 222 communicates with the cache memory over an address bus 18 and a data bus 16 during read and write operations to the cache memory 10. The read and write operations each comprise one clock cycle.

During write operations, the processor 222 transfers a write address to the cache memory 10 over the address bus 18, and transfers the corresponding write data over the data bus 16 during the same clock cycle. The cache memory 10 buffers the write operation in a store hit buffer. During read operations, the processor 222 transfers a read address to the cache memory 10 over the address bus 18, and receives the corresponding read data over the data bus 16 during the same clock cycle. The cache memory 10 contains circuitry for accessing the store hit buffer for the preceding write operation during address tag matching time of the read operation.

Figure 2:
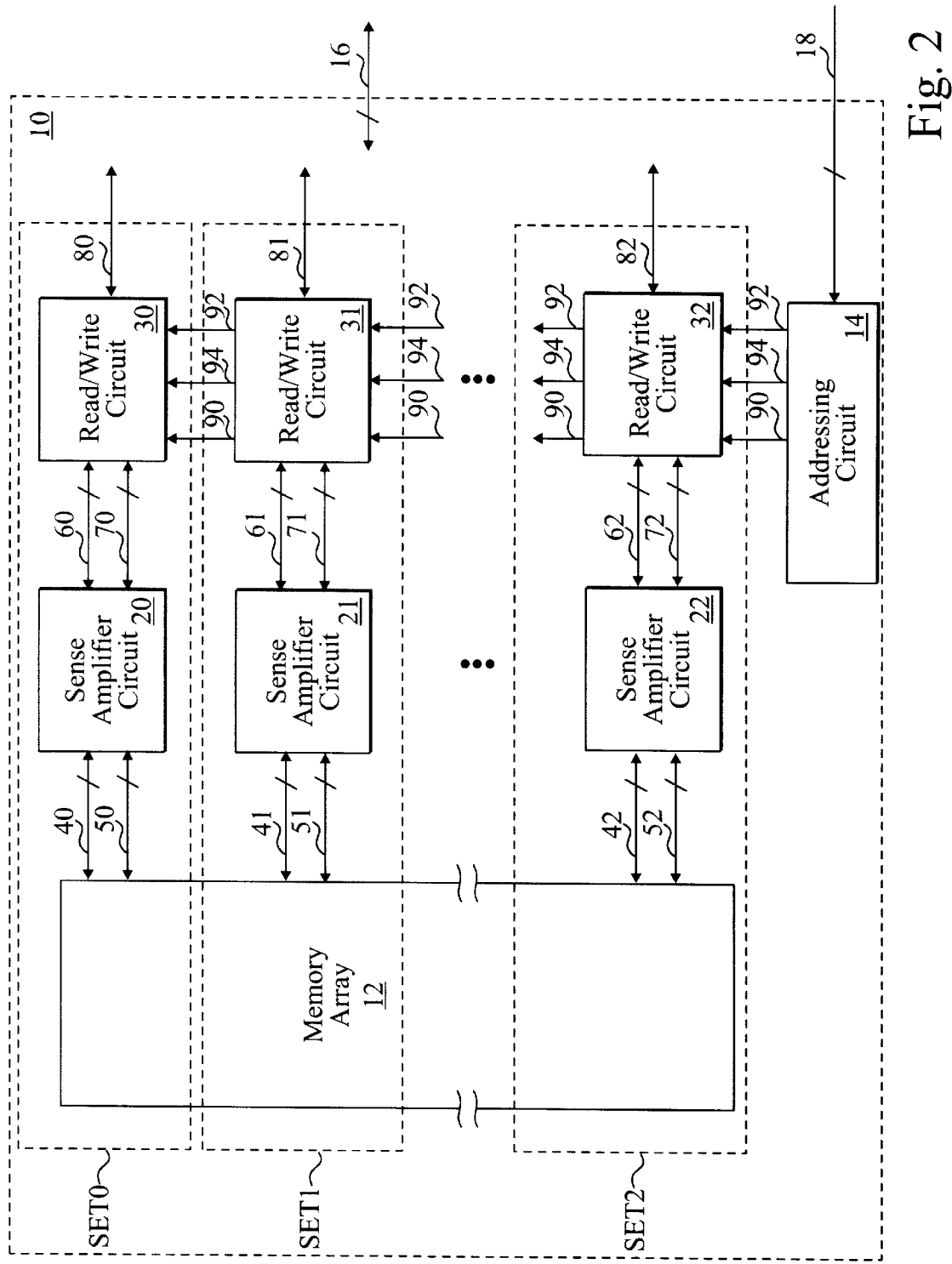
FIG. 2 illustrates the cache memory of the present invention in one embodiment which comprises a memory array, a set of sense amplifier circuits, a set of read/write circuits, and an addressing circuit.

FIG. 2 illustrates the cache memory 10 of one embodiment of the present invention. The cache memory 10 comprises a memory array 12, a set of sense amplifier circuits 20–22, a set of read/write circuits 30–32, and an addressing circuit 14. The cache memory 10 is arranged as a four-way, set associative cache comprising a plurality of sets referred to as SET0 through SETN.

The memory array 12 provides an array of memory cells that store cache line data and associated address tags. For one embodiment, the memory array 12 provides storage for 128K cache lines and corresponding address tags for the cache lines.

The sense amplifier circuits 20–22 each contain a set of sense amplifiers that sense cache line data and address tags from the memory array 12 over the bit lines of the memory array 12. The sense amplifier circuit 20 senses cache line data from the memory array 12 over a set of data bit lines 40 and senses the corresponding address tags over a set of address tag bit lines 50. Similarly, the sense amplifier circuits 21 and 22 sense cache line data from the memory array 12 over sets of cache data bit lines 41 and 42, respectively. The sense amplifier circuits 21 and 22 sense address tags from the memory array 12 over sets of address tag bit lines 51 and sets of address tag bit lines 52, respectively.

The sense amplifier circuits 20–22 differentially sense and amplify the corresponding cache data bit lines and address tag bit lines and provide the sensed cache line data and address tags to the read/write circuits 30–32. The sets of bit lines 40–42 each comprise bit lines of the memory array 12 that provide the four way storage of a single cache line data bit in the memory array 12. The bit lines 50–52 each comprise sets of bit lines of the memory array 12 that provide four way address tags for the corresponding cache line data on the bit lines 40–42. For one embodiment, each of the four way address tags comprises 20 bits.

The read/write circuits 30–32 each receive the four way cache line data bits and associated four way address tags from the sense amplifier circuits 20–22. The read/write circuits 30–32 each select the appropriate cache line data according to a tag compare address 92 generated by the addressing circuit 14. The read/write circuit 30 receives a set of four way cache data bits 60 and corresponding four way address tags on line 70 from the sense amplifier circuit 20. The read/write circuit 30 generates a selected data bit on line 80 from the cache data bits 60 according to the tag compare address 92. The read/write circuit 30 compares the four way address tags on lines 70 to the tag compare address 92 to select one of the cache data bits 60 as the selected data bit on line 80.

The read/write circuit 31 receives a set of four way cache data bits 61 and corresponding four way address tags on lines 71 from the sense amplifier circuit 21. The read/write circuit 31 compares the tag compare address 92 with the four way address tags on lines 71 to select one of the cache data bits 61 for the selected data bit on line 81. Similarly, the read/write circuit 32 receives a set of four way data bits 62 and the corresponding four way address tags on lines 72 from the sense amplifier circuit 22 and generates a selected data bit on line 82 by comparing the tag compare address 92 with each of the four way address tags on lines 72.

The addressing circuit 14 receives read and write access addresses for the cache memory 10 over an address bus 18. The addressing circuit 14 generates the tag compare address 92 for each read access address received over the address bus 18 during a read operation to the cache memory 10. The addressing circuit 14 also generates a set address 90 that specifies one of the sets SET0 through SETN for the read operation to the cache memory 10.

During a write operation to the cache memory 10 the addressing circuit 14 receives a write address over the address bus 18. The addressing circuit 14 then generates the set address 90 that specifies one of the sets SET0 through SETN as the target for the write operation. The addressing circuit 14 also generates a set of write control signals 94. The write control signals 94 specify one of the four ways of the selected set SET0 through SETN for the write operation. The write control signals 94 also include the byte enable signals for the cache line data written to the cache memory 10 over the data bus 16.

Figure 3:
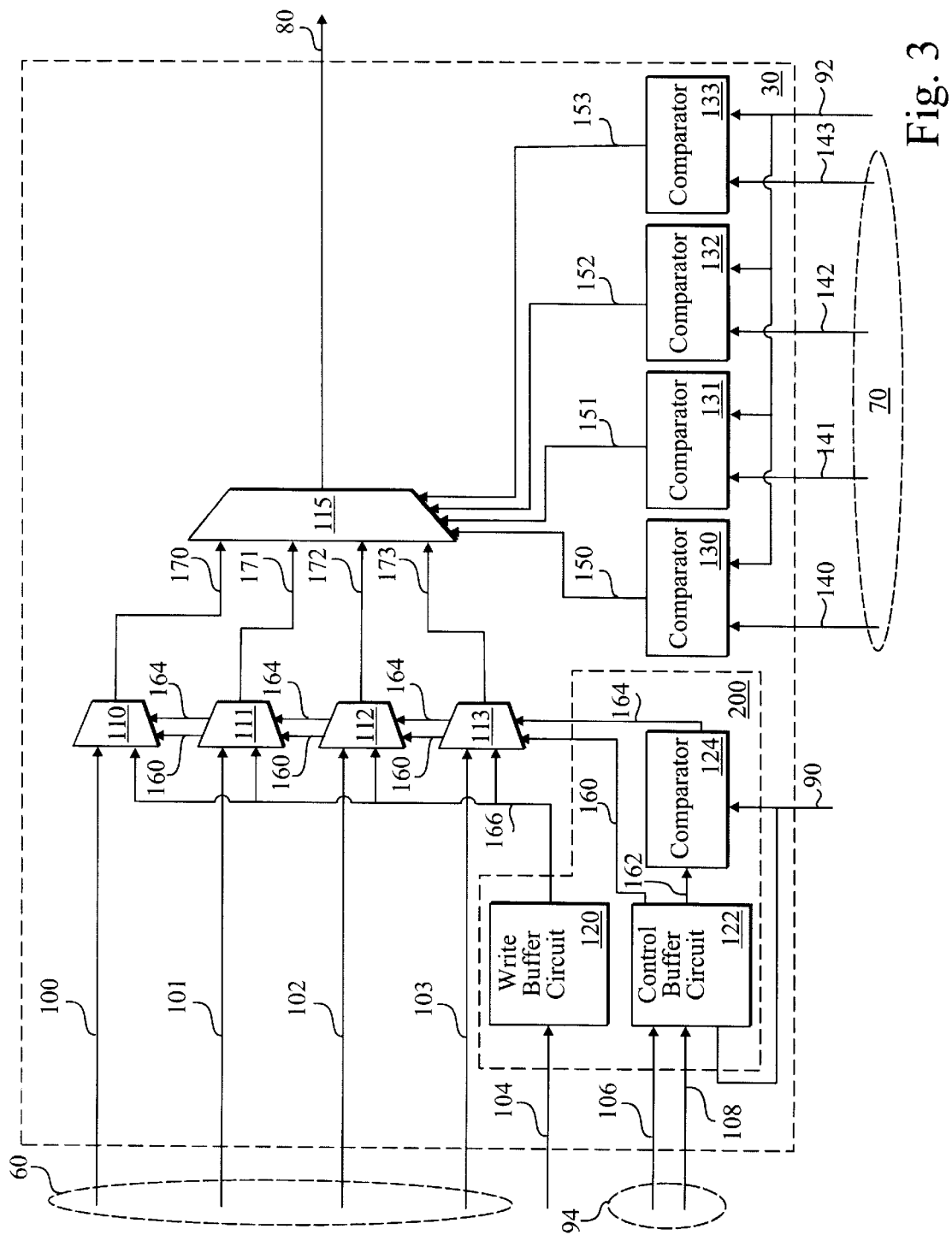
FIG. 3 illustrates a read/write circuit for one embodiment which comprise a store hit buffer that includes a write buffer circuit, a control buffer circuit and a comparator.

FIG. 3 illustrates the read/write circuit 30 for one embodiment. The read/write circuits 31 and 32 are each substantially similar to the read/write circuit 30. The read/write circuit 30 comprises a store hit buffer 200 that includes a write buffer circuit 120, a control buffer circuit 122 and a comparator 124. The read/write circuit 30 further comprises a set of 2 to 1 (2:1) multiplexers 110–113, a four way multiplexer 115 and a set of comparators 130–133.

The store hit buffer 200 buffers each write operation received from the processor 222 over the data bus 16 and address bus 18. If a read operation issued by the processor 222 is targeted for data stored in the store hit buffer 200, then the data from the store hit buffer 200 is substituted for data from the memory array 12. The access time to the store hit buffer 200 is masked by the normal address tag matching interval of the cache line read access. The buffered write operation in the store hit buffer 200 is written to the memory array 12 during a write cycle.

The write buffer circuit 120 buffers a write data bit 104 received over the data bus 16 during a write operation. For one embodiment, the write buffer circuit 120 is implemented by a set of latches. For another embodiment, the write buffer circuit 120 implements a set of master/slave flip flops.

The control buffer circuit 122 buffers a write way signal 106, a set of byte enable signals 108, and the set address 90 for each write operation to the cache memory 10. The write way signal 106 specifies one of the four ways of the cache memory 10 for each write operation. The byte enable signals 108 correspond to the cache line data written to the cache memory 10 over the data bus 16 during each write operation. For one embodiment, the control buffer circuit 122 comprises a set of master/slave flip flops.

The 2:1 multiplexers 110–113 are each controlled by a set of buffered byte enable signals 160 from the control buffer circuit 122 and a set compare result 164 from the comparator 124. The set compare result 164 indicates whether a read operation to the cache memory 10 is targeted for the cache line data buffered in the write buffer circuit 120. The comparator 124 generates the set compare result 164 by comparing a buffered set address 162 (the address of the last write operation) from the control buffer circuit 122 with the set address 90.

The 2:1 multiplexers 110–113 select either the buffered data bit 166 from the write buffer circuit 120 or one of the corresponding four way cache line data bits 60 received from the sense amplifier circuit 20. The four way cache line data bits 60 comprise a set of cache line data bits 100–103. The multiplexer 110 selects either the cache line data bit 100 or the buffered data bit 166. The multiplexer 111 selects either the cache line data bit 101 or the buffered data bit 166. The multiplexer 112 selects either the cache line data bit 102 or the buffered data bit 166, and the multiplexer 113 selects either the cache line data bit 103 or the buffered data bit 166.

If the set address 90 for a read operation to the cache memory 10 matches the buffered set address 162 for the cache line bit stored in the write buffer circuit 120, then the set compare result 164 causes one of the 2:1 multiplexers 110–113 to select the buffered data bit 166. The selected data bit is transferred to the four way multiplexer 115 over a set of 2:1 mux data lines 170–173.

If the set address 90 for a read operation to the cache memory 10 does not match the buffered set address 162 for the cache line bit stored in the write buffer circuit 120, then the set compare result 164 causes the 2:1 multiplexers 110–113 to select the cache line data bits 100–103 for transfer to the four way multiplexer 115 over the 2:1 mux data lines 170–173.

The comparators 130–133 each compare the tag compare address 92 to one of the four way address tags 70 received from the sense amplifier circuit 20. The four way address tags 70 comprise a set of address tags 140–143.

The comparator 130 generates a match signal 150 by comparing the address tag 140 to the tag compare address 92. The comparator 131 generates a match signal 151 by comparing the address tag 141 with the tag compare address 92. Similarly, the comparator 132 generates a match signal 152 by comparing the address tag 142 with the tag compare address 92 and the comparator 133 generates a match signal 153 by comparing the address tag 143 with the tag compare address 92.

The match signals 150–153 control the four way multiplexer 115. The four way multiplexer 115 generates a selected data bit 80 for transfer over the data bus 16 during a read operation from the cache memory 10 by the processor 222. The four way multiplexer 115 selects a cache line data bit for a read operation from among the 2:1 mux data lines 170–173 according to the match signals 150–153.

Figure 4:
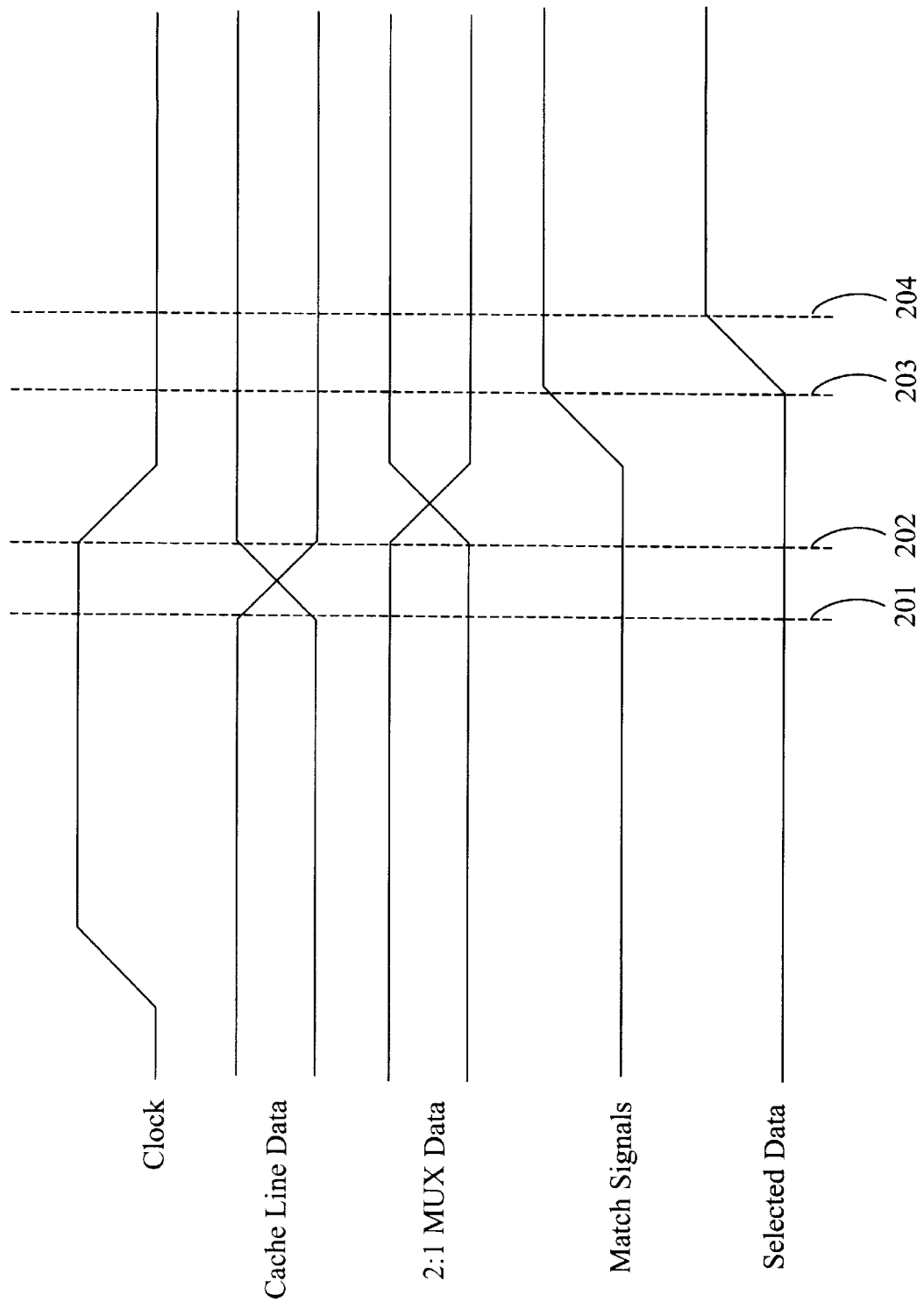
FIG. 4 illustrates the timing of a read operation to a cache memory for one embodiment, showing the timing of the cache line data generated by a sense amplifier circuit, the timing of 2:1 mux data lines, the timing of match signals, and the timing of a selected data bit.

FIG. 4 illustrates the timing of a read operation to the cache memory 10 for one embodiment. The diagram shows the timing of the cache line data on lines 60–62 generated by the sense amplifier circuits 20–22 (CACHE LINE DATA), the timing of the 2:1 mux data lines 170–173 (2:1 MUX DATA), the timing of the match signals 150–153 (MATCH SIGNALS), and the timing of the selected data bit 80 (SELECTED DATA).

Prior to time 201, the comparator 124 compares the buffered set address 162 with the set address 90 for the read transaction and generates the set compare result 164. Starting at time 201, the cache line data 60–62 from the sense amplifier circuits 20–22 indicates the state of the addressed cache line for the read operation in the memory array 12. The interval between times 201 and 202 corresponds to a propagation delay for the multiplexers 110–113.

Thereafter at time 203, the comparators 130–133 generate the match signals 150–153 according to the tag compare address 92 for the read operation. At time 204, the selected data bit 80 is valid. The interval between times 203 and 4 corresponds to a propagation delay from the control input to the output of the multiplexer 115. The comparison time for the comparators 130–133 to generate the match signals 150–153 masks the propagation delay for the multiplexers 110–113.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An N-way, set associative cache memory comprising:
   a memory array having N sets of data bit lines and N sets of associated address tag bit lines;
   an addressing circuit which generates a tag compare address and a set address for a read operation, and write control signals for a write operation;
   N amplifier circuits, each of which is coupled to corresponding sets of the data/address tag bit lines of the memory array, each of the N amplifier circuits having outputs which provide data and address tags sensed from the respective data/address tag bit lines of the memory array;
   N read/write (R/W) circuits, each of which is correspondingly coupled to the outputs of the N amplifier circuits and also to the addressing circuit, each of the R/W circuits comprising:
   a buffer circuit for buffering write data/address information preceding a write operation, the buffer circuit including a comparator which generates a set compare result when the set address matches the write address;
   comparator means for comparing the address tags sensed by the N amplifier circuits with the tag compare address to produce a match signal; and
   multiplexer means controlled by the set compare result and match signal for selecting as a cache output either a write data bit from the buffer circuit or a data bit sensed from the memory array.

2. The cache memory of claim 1 wherein N=4.

3. The cache memory of claim 2 wherein the write control signals select one of the four ways for the write operation.

4. The cache memory of claim 1 wherein the buffer circuit also buffers a write way signal specifying which one of the N ways the write data is to be written to in the memory array.

5. The cache memory of claims 1, 2, 3 or 4 wherein the match signal is produced by the comparator means in a matching interval which is substantially the same as an access time to the write data of the buffer circuit.

6. A computer system comprising:
   a processor;
   data and address buses coupled to the processor;
   an N-way, set associative cache memory coupled to the processor via the data and address buses, the cache memory comprising:
   a memory array having N sets of data bit lines and N sets of associated address tag bit lines;
   an addressing circuit coupled to the address bus, the addressing circuit generating a tag compare address and a set address for a read operation by the processor, and write control signals for a write operation by the processor;

N amplifier circuits, each of which is coupled to corresponding sets of the data/address tag bit lines of the memory array, each of the N amplifier circuits having outputs which provide data and address tags sensed from the respective data/address tag bit lines of the memory array;

N read/write (R/W) circuits, each of which is correspondingly coupled to the outputs of the N amplifier circuits and also to the addressing circuit, each of the R/W circuits comprising:

a buffer circuit for buffering write data/address information preceding a write operation, the buffer circuit including a comparator which generates a set compare result when the set address matches the write address;

comparator means for comparing the address tags sensed by the N amplifier circuits with the tag compare address to produce a match signal; and multiplexer means controlled by the set compare result and match signal for selecting as a cache output either a write data bit from the buffer circuit or a data bit sensed from the memory array.

7. The computer system of claim 6 wherein N=4.

8. The computer system of claim 7 wherein the write control signals select one of the four ways for the write operation.

9. The computer system of claim 8 wherein the buffer circuit also buffers a write way signal specifying which one of the four ways the write data is to be written to in the memory array.

10. The computer system of claims 6, 7, 8 or 9 wherein the match signal is produced by the comparator means in a matching interval which is substantially the same as an access time to the write data of the buffer circuit.

11. In a computer system which includes a processor which performs memory transactions that include a write operation for writing data to an N-way, set associative cache memory, and a read operation for reading data from the cache memory, a method of performing such a memory transaction comprising the steps of:

generating a tag compare address and a set address for the read operation, and write control signals which select one of the N ways for the write operation;

sensing data and address tags from the associated bit lines of a memory array in the cache memory;

buffering write data/address information preceding the write operation;

generating a set compare result when the set address matches the write address;

comparing the sensed address tags with the tag compare address to produce a match signal; and selecting as an output either a write data bit from the buffer circuit or a data bit sensed from the memory array.

12. The method of claim 11 further comprising the additional step of:

buffering a write way signal specifying which one of the N ways the write data is to be written to in the memory array.

* * * * *

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Title page,
In the illustrative Fig., "COMMUNITIONS" should read -- COMMUNICATION --.
Item [56], Reference Cited, U.S. PATENT DOCUMENTS, insert --
4,751,732    6/1998  Kamitake    38/20; and
4,827,508    3/1991  Shear       380/4--.

Item [56], Reference Cited, FOREIGN PATENT DOCUMENTS, "244447" should read -- 2-44447 -- and "464129" should read -- 4-64129 --.

Item [56], OTHER PUBLICATIONS, "cryptgraphic" should read -- cyptographic --.

Drawings,
Sheet 2, Fig. 2, "ACCOMDATOR" should read -- ACCOMODATOR --.

Sheet 3, Fig. 3, "COMMUNITIONS" should read -- COMMUNICATIONS --.

Sheet 4, Fig. 4, "BEGGINNING" should read -- BEGINNING --.

Sheet 7, Fig. 8, "CRYPTGRAPHY" should read -- CRYPTOGRAPHY --.

Sheet 8, Fig., 9, "CRYPTGRAPHY" should read -- CRYPTOGRAPHY --.

Sheet 10, Fig. 12, "CRYPTGRAPHY" should read -- CRYPTOGRAPHY --.

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Column 5,
Line 3, "accommodater" should read -- accommodator --;
Line 17, "informaiton" should read -- information --;
Line 25, "be by" should read -- be done by --; and
Line 35, "the" should read -- the --.

Column 6,
Line 31, "out-let" should read -- outlet --;
Line 59, "anmount" should read -- amount --; and
Line 65, "and" should read -- and --.

Column 7,
Line 19, "use" should read -- use of --; and
Line 34, "following" should read -- the following --.

Column 8,
Line 20, "massage" should read -- message --.

Column 9,
Line 10, "IN" should read -- in --;
Line 36, "hierarchial" should read -- hierarchical --; and
Line 50, "T81," should read -- T.81, --.

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Column 11,
Line 2, "altervatively" should read -- alternatively --;
Line 34, "distributer" should read -- distributor --; and
Line 42, "distributer" should read -- distributor --.

Column 13,
Line 2, "B-picture" should read -- B-pictures --; and
Line 10, "nexst" should read -- next --.

Column 14,
Line 19, "I-frame," should read -- I-frames, --;
Line 39, "the" (second occurrence) should be deleted; and
Line 59, "informaiton" should read -- information --.

Column 15,
Line 55, "envrypted" should read -- encrypted --; and
Line 59, "informaiton" should read -- information --.

Column 16,
Line 3, "information" should read -- information --; and
Line 13, "IN" should read -- In --.

UNITED STATES PATENT AND TRADEMARK OFFICE
CERTIFICATE OF CORRECTION

PATENT NO. : 6,272,535 B1
DATED : August 7, 2001
INVENTOR(S) : Iwamura

It is certified that error appears in the above-identified patent and that said Letters Patent is hereby corrected as shown below:

Column 19,
Line 44, "Computing," should read -- Computing. -- and begin a new paragraph at "OS";
Line 48, "based" should read -- based on --.

Column 20,
Line 32, "PP, in" should read --PP. In --.

Column 21,
Line 24, "charge" should read -- charge. --; and
Line 40, "subtrated" should read -- subtracted --.

Column 22,
Line 35, "information" should read -- information --; and
Line 40, "informaiotn" should read -- information --.

Column 24,
Line 4, "it" should read -- at --; and
Line 7, "apparatus" should read -- apparatus according --.

Signed and Sealed this

Thirtieth Day of July, 2002

*Attest:*

JAMES E. ROGAN
*Attesting Officer*   *Director of the United States Patent and Trademark Office*